July 16, 1968     A. SLADE     3,393,110

HIGH-FREQUENCY ZIG-ZAG WELDING

Filed March 9, 1965

INVENTOR

*Artur Slade*

BY *Stevens, Davis, Miller & Mosher*
ATTORNEYS

United States Patent Office 3,393,110
Patented July 16, 1968

3,393,110
HIGH-FREQUENCY ZIG-ZAG WELDING
Artur Slade, Leicester, England, assignor to Algemene Kunstzijde Unie N.V., Arnhem, Netherlands, a corporation of the Netherlands
Filed Mar. 9, 1965, Ser. No. 438,308
Claims priority, application Netherlands, Mar. 18, 1964, 6402850
12 Claims. (Cl. 156—290)

ABSTRACT OF THE DISCLOSURE

Seams are formed in fabrics containing thermoplastic material by overlapping edges of such fabrics and then heating the thus-overlapped edges to a temperature sufficient to weld the overlapped thermoplastic material, at a plurality of elongated spots in two rows parallel to the seam, with the spots in one row in overlapping relation to the spots in the other row. Optionally, the welding may be carried out along a cut edge of one layer of such fabric thereby forming, in effect, a selvedge edge resistant to raveling or laddering. The process is particularly useful with knitted fabrics composed in whole or substantial part of polyamide threads or yarns.

---

This invention relates to a method for the welding, or fusion seaming, preferably by means of high-frequency electric energy, of textile products, more particularly knitted and woven fabrics, or for finishing the edges thereof, which products are at least partially made of a thermoplastic material, such as nylon, polyethylene-terephthalate and the like, the welding seam being formed by a plurality of separate welding zones dispersed one after another in the longitudinal direction of the seam. The invention also is directed to an apparatus for producing such an article.

The joining of articles composed wholly or substantially of nylon, polyvinyl alcohol, cellulose acetate, polyethylene-terephthalate and other thermoplastic fiberforming synthetic materials by welding or "electronic stitching" instead of by conventional sewing with threads has assumed considerable importance as the use of such materials in the production of knitted woven fabrics has increased.

One such expedient has been to weld textile products so that the welding seam is continuous or uninterrupted. However, while such a welding seam provides a reasonably strong joint, it lacks the required flexibility which is particularly important in textile products.

To avoid rigidity, and to provide a measure of flexibility, it has been proposed that the parts to be joined, or the edges to be finished, be "spot welded," instead of being joined along a solid line running the entire length of the seam. A method for so welding fabrics of nylon and the like is described in U.S. Patent No. 2,992,958, of Sakuji Yamaguchi. Another method, together with suitable apparatus, for spot-welding fabrics of thermoplastic materials is described in Belgian Patent No. 550,198. Articles so produced, however, are not entirely satisfactory since, for many purposes, the resulting seam is not as strong as desired. More particularly, in so treating knitted fabrics the number of welded loops is quite limited, so that when the knitted fabric is cut near the welding seam laddering or fraying readily occurs.

It is an object of the present invention to produce textile products which are free of the above-described drawbacks.

It is a further object of this invention to produce a welded seam in a fabric comprising thermoplastic fibers which is strong and flexible. Another object of this invention is the treatment of a fabric composed in whole or part of thermoplastic synthetic fibers so as to form an edge or selvedge seam which is substantially free of any tendency to fray, ravel or ladder.

A still further object of this invention is a fabric comprising thermoplastic fibers having one or more seams or edges thereof welded at a plurality of zones which are spaced apart in two parallel lines but in an overlapping relationship.

These and other objects will be readily apparent from the following description and the accompanying drawings in which.

Figure 1:
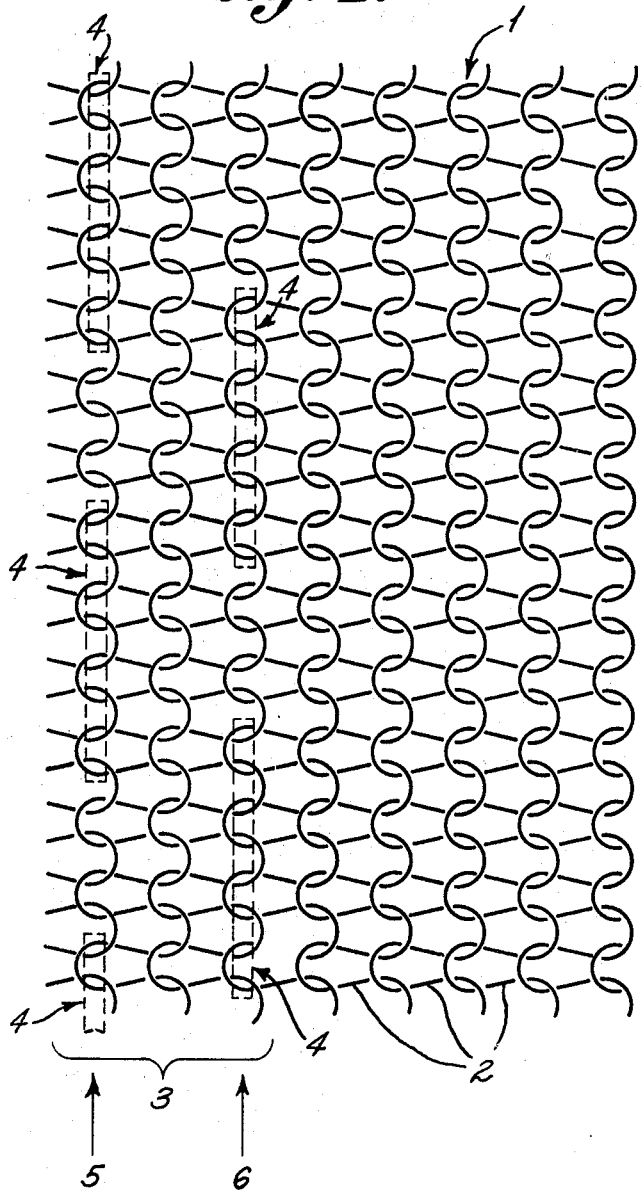
FIGURE 1 shows a welding seam for a knitted fabric.

FIGURE 1 shows, on a substantially magnified scale, a knitted fabric 1 made up of a synthetic thermoplastic polymer, such as polyamide, threads or yarns 2. The knitted fabric 1 may be welded by application of high-frequency electric energy in the known manner, to another layer of knitted fabric (not shown) by means of the welding seam 3. For a single thickness of fabric, the resulting seam will serve as a selvedge edge.

The welding seam 3 is made up of a number of separate relatively narrow elongated or dash-like welding zones or spots 4 which are arranged sequentially in the longitudinal direction of the seam. In the embodiment shown in the drawing the zones or spots 4 are arranged in two rows 5 and 6 which extend in the direction indicated by the arrows and are spaced apart in a direction transverse to the seam 3. The rows 5 and 6 of welding spots are parallel to the longitudinal axis of the welding seam 3 and each of the welding spots 4 of one row partially overlaps two successive welding spots of the other row. The rows 5 and 6 of welding spots extend along two courses of the knitted fabric 1 and the distance between the rows is about twice the distance between two adjacent courses. In the longitudinal direction of the welding seam 3 the welding spots 4 extend over four stitches of the knitted fabric.

Figure 2:
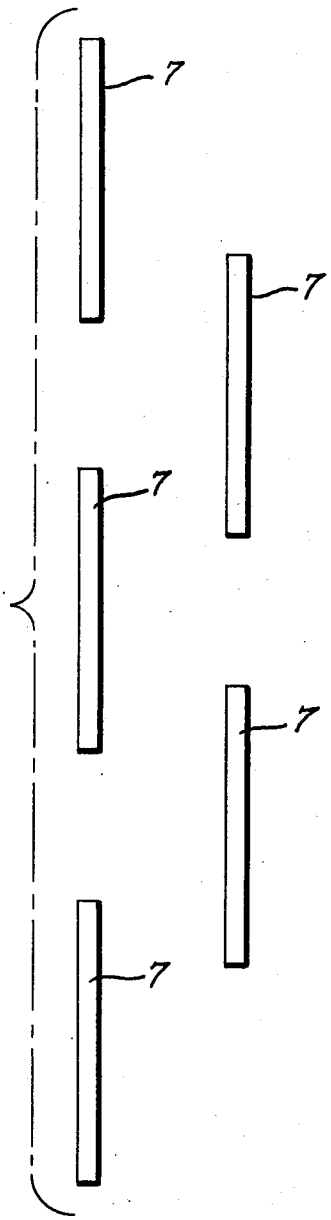
FIGURE 2 shows a suitable arrangement of electrodes in a device for producing the improved welding in accordance with the invention.

FIGURE 2 shows, more or less diagrammatically, the arrangement of a set of parallel electrodes 7, which are arranged in two rows spaced apart in a direction transverse to the welding seam to be made. The electrodes of one row extend partially alongside of the electrodes of the other row, thereby overlapping the same when viewed transversely. These electrodes are connected to a source of electric energy and form part of a suitable apparatus for high-frequency welding of thermoplastic films and fabrics. As is well-known in such devices, the electrodes 4 may be arranged in two complementary opposing sets which are relatively movable so as to clamp the material to be welded therebetween. In another suitable arrangement the electrodes are mounted upon the circumferences of two rolls and the material to be welded passes through the nip of the rolls during the welding operation.

The method according to the invention is characterized in that the welding spots extend alongside of one another, in parallel overlapping relation. In this way a joint or finished edge is obtained which has maximum strength as well as great flexibility. Knitted fabrics so prepared are no longer subject to laddering or fraying when they are cut near the welding seam.

The instant invention is particularly suitable for application in the stocking industry for linking the toes by means of high-frequency welding instead of sewing with thread or yarn in the conventional manner. This novel development is also suitable for application in the manufacture of socks and in general for all kinds of underwear and outerwear manufactured on weft knitting or warp knitting machines.

Application of the present method is not restricted to products made of polyamide yarns or threads. It may be used, for instance, in all textile products requiring a flexible, properly pliable, or elastic joint, in particular in elastic fabrics which contain, for instance, rubber threads or the like.

When the method according to the invention is used for joining knitted fabrics or finishing the edges thereof, favorable results are obtained if the welding zones or spots extend along the courses. The separation between the rows of welding spots should be equal to at least one, and preferably two, courses of the knitted fabric. It is most desirable that each of the welded zones include at least four of the knitted stitches in side-by-side relation.

The improved welded stitching of the invention is not limited to knitted fabrics but is also applicable to textile products in the form of driving belts, conveyor belts, tarpaulins, and the like, where flexible seams of maximum strength are required.

The invention also comprises a product provided with welded joints or finished edges, which product is at least partly composed of thermoplastic threads, in particular by knitting or weaving, and which is characterized in that the joints or edges are obtained by one or more of the above-described methods according to the invention.

A characteristic feature of the apparatus for producing articles with this novel seam is the plurality of relatively elongated and narrow separate electrodes which are positioned in a line along the longitudinal direction of the welding seam to be made and which may be connected to a source of high-frequency electric current, is characterized in that the elongated, narrow, or dash-shaped electrodes are arranged in two parallel rows which are spaced apart in a direction transverse to the welding seam to be made, with the electrodes of one row overlapping, at least in part, those of the other row.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A method for the welding of knitted textile fabrics made of thermoplastic yarn, which comprises forming the welding seam by a plurality of spaced-apart welding spots arranged in at least two rows one after another longitudinally of the seam, the rows of welding spots extending along the courses and the distance between two rows being at least equal to the distance between two adjacent courses, said welding spots being relatively elongated and extending parallel to the axis of said seam and the spots in one row being in overlapping relation to the spots of an adjacent row.

2. A method according to claim 1, in which each welding spot of one row of spots extends partially alongside of two successive welding spots of the adjacent row of spots.

3. A method for joining knitted fabrics or finishing the edges thereof according to claim 1 in which the dash-like welding spots extend over at least four stitches of the knitted fabric.

4. A method for the welding of textile products comprising fibers of a thermoplastic material which comprises forming the welding seam by spot welding of the fabric at a plurality of spaced zones in the longitudinal direction of the seam, said zones being elongated parallel to the said seam and in overlapping relation to one another.

5. A method according to claim 4, in which the welding zones are arranged in two rows which are spaced apart in a direction transverse to the seam.

6. A method according to claim 5 in which a welding zone of one row overlaps two successive welding zones of the adjacent row.

7. A method according to claim 6 in which the product is a knitted fabric and the rows of welding zones extend along separate courses.

8. A method according to claim 7 in which the zones are in non-adjacent courses.

9. A method as set forth in claim 6 in which each elongated welding zone crosses four successive loops of the knitted fabric.

10. A textile product comprising thermoplastic threads having a seam formed of two parallel rows of welded spots, said rows being spaced apart with the spots of one row arranged in an alternating, overlapping, relation to the spots of the second row.

11. A product as set forth in claim 10 in which the textile is a woven fabric.

12. A product as set forth in claim 10 in which the textile is a knitted fabric.

References Cited

UNITED STATES PATENTS

| | | | |
|---|---|---|---|
| 2,388,144 | 10/1945 | Headon | 161—89 |
| 2,999,042 | 9/1961 | Meister | 156—290 |
| 3,221,738 | 12/1965 | Ekberg et al. | 156—290 |
| 3,325,331 | 7/1963 | Schwanekamp et al. | 156—290 |

DOUGLAS J. DRUMMOND, *Primary Examiner.*